Feb. 16, 1954
L. F. KINKER
2,669,475
DOOR STOP AND HOLDER
Filed April 19, 1950
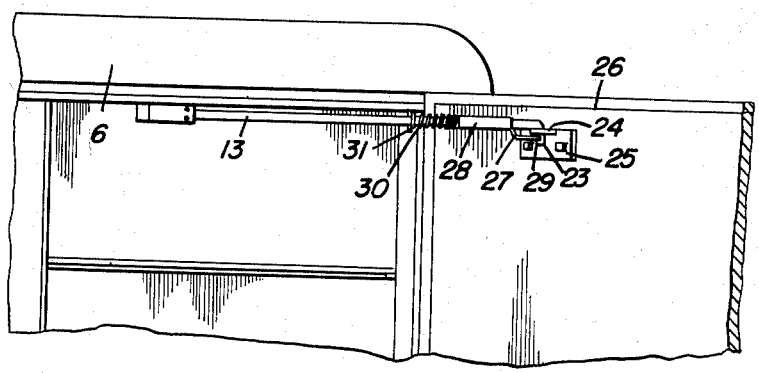
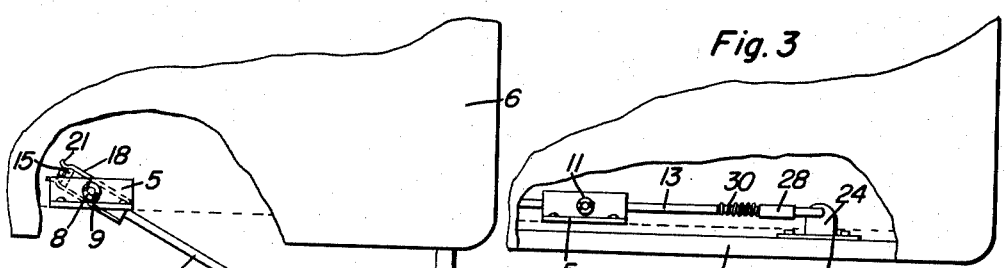
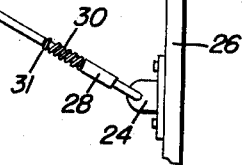
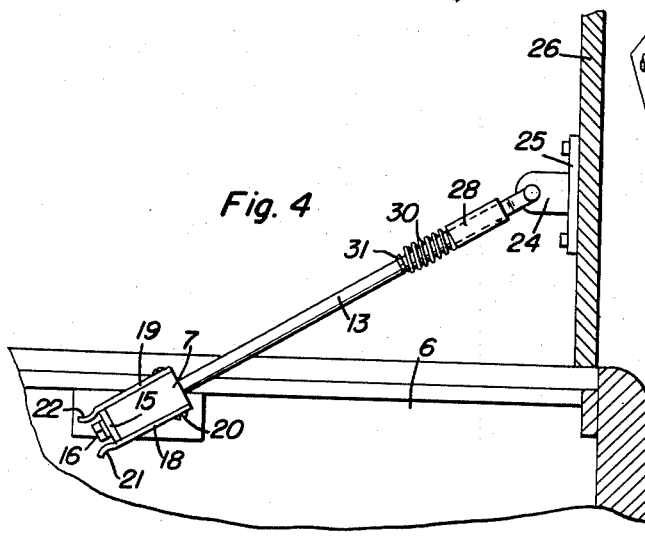
Lewis F. Kinker
INVENTOR.

Patented Feb. 16, 1954

2,669,475

UNITED STATES PATENT OFFICE 2,669,475

DOOR STOP AND HOLDER

Lewis F. Kinker, Burlington, Iowa, assignor of fifty per cent to John Tod, Burlington, Iowa Application April 19, 1950, Serial No. 156,859

1 Claim. (Cl. 292—262)

The present invention relates to new and useful improvements in door stops and holders and more particularly to a device of this character for use with truck doors or other closures to hold the door in an open position while the truck is being unloaded.

An important object of the invention is to provide a door stop and holder constructed to hold the door of a truck in an open position parallel to the sides of the truck to prevent injury to the door by other vehicles passing close to the truck, or when the truck is being loaded or unloaded in narrow spaces and also embodying means whereby the door stop and holder may be easily and quickly released from the door to permit complete opening movement thereof.

A further object of the invention is to provide a device of this character which may be easily and quickly attached in position at the rear of a truck without necessitating any changes or alterations in the construction thereof and which at the same time is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the rear of a truck showing the door stop and holder supporting the door in an open position;

Figure 2 is a top plan view, with parts broken away and shown in section;

Figure 3 is a similar view showing the door in closed position;

Figure 4 is a bottom plan view of the door stop and holder with parts shown in section; and, Figure 5 is a group perspective view of the pivoted guide for the sliding rod of the device together with the catches to hold the rod when the door is open.

Referring now to the drawing in detail wherein for the purpose of illustration I have disclosed a preferred embodiment of the invention, the numeral 5 designates an angle bracket adapted for attaching to the underside of the top 6 of a delivery truck at its rear open end. A guide block 7 is formed at its center with an upstanding pin 8 rotatably held at the underside of bracket 5 by a cotter pin or similar fastener 9 inserted in an opening 10 in the upper end of the pin 8. A washer 11 is placed under the cotter pin 9 to rest on bracket 5.

An oblong guide block 7 is formed with a longitudinal bore 12 slidably receiving a rod 13, one end of the rod being threaded as shown at 14 and to which is attached the square-shaped plate 15 held in position on the rod by a nut 16 with a washer 17 positioned between plate 15 and the nut.

A pair of leaf springs 18 and 19 are secured to opposite sides of guide blocks 7 by screws or the like 20 securing one end of the springs to the block and the free ends of the springs are formed with inwardly curved opposing jaws 21 and 22 positioned outwardly at one end of the block 7.

The other end of rod 13 is formed with a downturned hook 23 engaged in an eye 24 carried by a plate 25 attached to a truck door 26 adjacent its upper edge. Hook 23 is locked in position in eye 24 by means of a spring finger 27 projecting outwardly from one end of a tubular slide 28 on rod 13 and with the outer end of the spring finger 27 entering a notch or groove 29 in the hook 23. A coil spring 30 is positioned on rod 13 behind slide 28 and held under tension against the cotter pin 31 extending transversely through rod 13.

In the operation of the device, hook 23 of rod 13 is engaged in eye 24 of attaching plate or bracket 25 carried by the door 26 of the truck and with the spring 30 locking the spring finger 27 in engagement with the hook 23 to hold the rod in position. The other end of rod 13 is slidable in guide block 7 and when door 26 is swung into its open position, plate 15 moves inwardly toward the guide blocks 7 and is snapped into position between jaws 21 and 22 of springs 18 and 19 to hold the door 26 in its open position parallel to the sides of the truck.

The door 26 will thus be held in its open position while the truck is being loaded or unloaded and a predetermined force applied to the door in a direction to close the same will release plate 15 from spring jaws 21 and 22 to permit closing of the door.

When it is desired to open the door 26 to its fully open position, the spring finger or catch 27 is released from hook 23 by sliding the slide 28 rearwardly on rod 13 and the hook 23 may then be released from bracket 25.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having thus described the invention, what is claimed as new is:

A closure stop and holder comprising a rod having a notched end hook, a bracket adapted for attaching to a swingable closure and having an eye in which said end hook is pivoted, a spring-pressed sleeve on said rod having a spring finger thereon and slidable on said rod by said spring into position for engagement of said finger with said notch to lock the end hook in said eye, and means attachable to a stationary structure against which the closure is closed and pivotally and slidably supporting the other end of the rod.

LEWIS F. KINKER.

References Cited in the file of this patent

UNITED STATES PATENTS

| Number | Name | Date |
|---|---|---|
| 448,767 | Rentz | Mar. 24, 1891 |
| 1,485,954 | Brasch | Mar. 4, 1924 |
| 1,720,886 | DeLoss | July 16, 1929 |
| 1,874,632 | Sanon | Aug. 30, 1932 |
| 1,942,665 | Schmitt | Jan. 9, 1934 |

FOREIGN PATENTS

| Number | Country | Date |
|---|---|---|
| 371,206 | Great Britain | Apr. 21, 1932 |